US010911332B2

(12) United States Patent
Barton et al.

(10) Patent No.: US 10,911,332 B2
(45) Date of Patent: Feb. 2, 2021

(54) TIME SENSITIVE NETWORKING IN A MICROSERVICE ENVIRONMENT

(71) Applicant: Cisco Technology, Inc., San Jose, CA (US)

(72) Inventors: Robert Edgar Barton, Richmond (CA); Jerome Henry, Pittsboro, NC (US); Matthew William Gillies, North Vancouver (CA); Ian James Wells, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 39 days.

(21) Appl. No.: 16/221,857

(22) Filed: Dec. 17, 2018

(65) Prior Publication Data

US 2020/0195528 A1    Jun. 18, 2020

(51) Int. Cl.
*G06F 15/173* (2006.01)
*H04L 12/24* (2006.01)
(Continued)

(52) U.S. Cl.
CPC ...... *H04L 41/5054* (2013.01); *H04L 41/0893* (2013.01); *H04L 47/2425* (2013.01);
(Continued)

(58) Field of Classification Search
CPC . H04L 41/0803; H04L 41/08; H04L 67/1008; H04L 67/2804
(Continued)

(56) References Cited

U.S. PATENT DOCUMENTS 9,705,737 B2    7/2017 Wetterwald et al.
9,716,617 B1    7/2017 Ahuja et al.
(Continued)

OTHER PUBLICATIONS

NetWorld2020, "Smart Networks in the context of NGI", Strategic Research and Innovation Agenda 2021-27, European Technology Platform NetWorld2020, Apr. 2018, 114 pages.
(Continued)

*Primary Examiner* — Wing F Chan
*Assistant Examiner* — Andrew Woo
(74) *Attorney, Agent, or Firm* — Edell, Shapiro & Finnan, LLC (57) ABSTRACT

A cloud orchestration platform obtains from a policy controller, application flow requirements for an application to be deployed in a container network that includes a plurality of microservices. The cloud orchestration platform determines a path through at least a subset of the plurality of microservices based on the application flow requirements, and computes information describing compute resources for workloads associated with the path through the plurality of microservices needed to support the application flow requirements. The cloud orchestration platform creates and/or reserves the workloads among the plurality of microservices. The cloud orchestration platform communicates scheduling requirements to a scheduling driver function associated with the plurality of microservices, the scheduling deriver function using the scheduling requirements to coordinate scheduling of workloads based on the path. The cloud orchestration platform directs traffic associated with the application into the container network.

20 Claims, 6 Drawing Sheets

(51) Int. Cl.
  *H04L 12/911* (2013.01)
  *H04L 29/08* (2006.01)
  *H04L 12/851* (2013.01)
  *H04L 12/859* (2013.01)
(52) U.S. Cl.
  CPC .......... *H04L 47/2475* (2013.01); *H04L 47/72* (2013.01); *H04L 47/822* (2013.01); *H04L 47/826* (2013.01); *H04L 67/10* (2013.01)
(58) Field of Classification Search
  USPC .................................................. 709/223, 226
  See application file for complete search history.

(56) References Cited

U.S. PATENT DOCUMENTS

| | | |
|---|---|---|
| 9,749,428 B2 | 8/2017 | Lawson et al. |
| 9,866,431 B2 | 1/2018 | Wetterwald et al. |
| 2011/0125894 A1* | 5/2011 | Anderson ............... G06F 21/31 709/224 |
| 2016/0127254 A1 | 5/2016 | Kumar et al. |

OTHER PUBLICATIONS

Bob Noseworthy, Network World, "The growing importance of Time Sensitive Networks", https://www.networkworld.com/article/3189131/lan-wan/the-growing-importance-of-time-sensitive-networks.html, Apr. 11, 2017, 6 pages.

* cited by examiner

TIME SENSITIVE NETWORKING IN A MICROSERVICE ENVIRONMENT

TECHNICAL FIELD

The present disclosure relates to ensuring performance of a computer network.

BACKGROUND

A microservices architecture may use containers. A container is an isolated execution environment on a host device, such as a server. The container includes its own users, file system, processes, and network stack. When an application is executed in the container, the application is isolated from the host device and other containers on the host device. For example, a web application may be treated as a plurality of applications, each performing an individual task. Each of the applications may be in its own container.

Time sensitive networking, or deterministic networking, may be used to support latency requirements for applications, such as Internet of Things (IoT) applications. Such applications rely on predictable latency and jitter across the network. While time sensitive networking models have been used to achieve deterministic packet delivery in traditional computer networks by assigning transmission timeslots for packets, the time sensitive networking models have not been adapted to achieve deterministic packet delivery in a microservices architecture that includes containers.

DESCRIPTION OF EXAMPLE EMBODIMENTS

Overview

Briefly, techniques for time sensitive networking in a microservices environment are disclosed. A cloud orchestration platform obtains from a policy controller, application flow requirements for an application to be deployed in a container network that includes a plurality of microservices. The cloud orchestration platform determines a path through at least a subset of the plurality of microservices based on the application flow requirements, and computes information describing compute resources for workloads associated with the path through the plurality of microservices needed to support the application flow requirements. The cloud orchestration platform creates and/or reserves the workloads among the plurality of microservices. The cloud orchestration platform communicates scheduling requirements to a scheduling driver function associated with the plurality of microservices, the scheduling deriver function using the scheduling requirements to coordinate scheduling of workloads based on the path. The cloud orchestration platform directs traffic associated with the application into the container network.

EXAMPLE EMBODIMENTS

Figure 1:
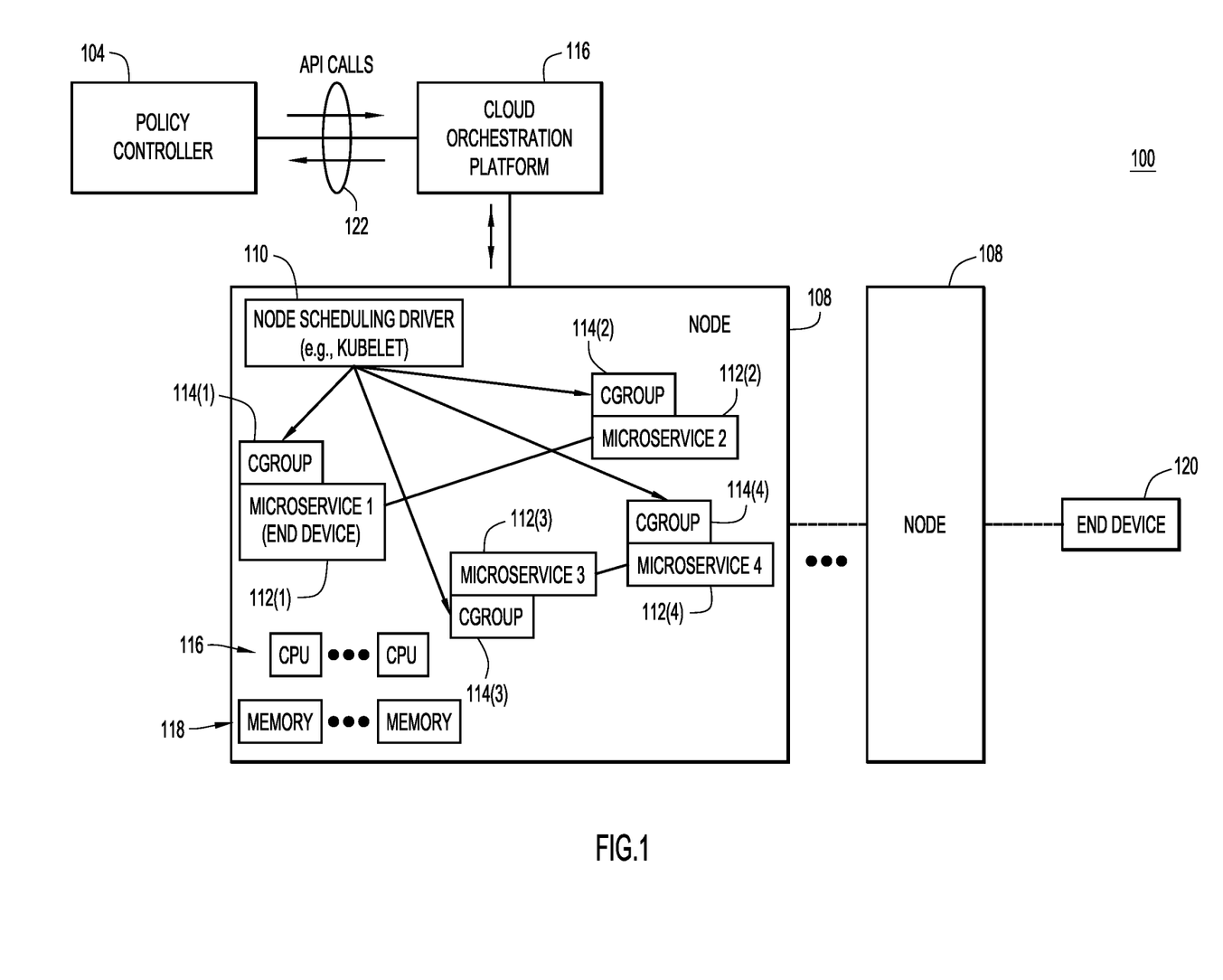
FIG. 1 is block diagram of a microservices environment configured to use time sensitive networking techniques, according to an example embodiment.

With reference made to FIG. 1, a block diagram is shown of a microservices environment 100 configured to use time sensitive networking techniques, according to an example embodiment. The microservices environment 100 also includes a policy controller 104, a cloud orchestration platform 106 and a node 108. There may be multiple node instances in a given container network environment, as shown in FIG. 1. The node 108 includes a node scheduling driver 110 and a plurality of microservices 112(1)-112(4) that form a container network. The node 108 is a compute node that includes central processing unit (CPU) resources 116 and memory resources 118, and is configured with software to perform the operations of the node scheduling driver 110 and the plurality of microservices 112(1)-112(4). The policy controller 104 is also referred to herein as a time sensitive network controller.

The plurality of microservices 112(1)-112(4) may perform application functions, load balancer functions, or firewall functions, for example. Each of the plurality of microservices 112(1)-112(4) may be associated with one of a plurality of control groups (cgroups) 114(1)-114(4). While the policy controller 104 is shown as being external to the node 108, it is to be understood that the policy controller 104 may also be instantiated as a microservice within the node 108.

The cloud orchestration platform 106 is in communication with the policy controller 104 via Application Programming Interface (API) calls shown at 122. The cloud orchestration platform 106 is in communication with the node scheduling driver 110 of the node 108. In one embodiment, the cloud orchestration platform 106 is a Kubernetes® master orchestration entity and the node scheduling driver 110 is a so-called Kubelet.

FIG. 1 further shows that the microservice 112(1) may serve as an end device with respect to an application running on the node 108 that has associated traffic between the microservice 112(1) and an end device 120 through the plurality of microservices 112(2)-112(4) of the node 108. In one embodiment, as shown in FIG. 1, the end device 112(1) is internal to the node 108 and is embodied by the microservice 112(1), and in another embodiment, the end device 112(1) may be running on a device external to the node 108.

The application running on the node 108 may have minimum network performance requirements for the network traffic, such as end-to-end latency and jitter. A latency-sensitive application has basic flow requirements that are defined on the policy controller 104. A network administrator may define the application flow requirements on the policy controller 104, and this may include end-to-end latency and jitter requirements for the application.

The policy controller 104 communicates application flow requirements a to the cloud orchestration platform 106 via API calls between the policy controller 104 and the cloud orchestration platform 106.

Based on the application flow requirements and its knowledge of the microservices 112(1)-112(4) running on the node 108, the cloud orchestration platform 106 determines an optimal application path through the microservices of the node 108 for the application's flow. In this way, the cloud orchestration platform 106 discovers the workloads and workload network path through the microservices 112(1)-112(4) needed to service the application flow. The cloud orchestration platform 106 can use a variety of methods to discover this workload path, such as by generating a synthetic flow (using a synthetic probe packet) through the microservices.

The cloud orchestration platform 106 then communicates back to the policy controller 104, informing it of the network path through the various microservice workloads. The policy controller 104 generates a manifest file for the cloud orchestration platform 106 based on the application's requirements and the workloads involved.

The cloud orchestration platform 106 receives the manifest file from the policy controller 104 through the API calls 122 and calculates the necessary hardware/compute resources for the workloads. Dedicated workloads are either created or reserved.

The cloud orchestration platform 106 communicates to the node scheduling driver 110 (e.g., a Kubelet) on the node 104. Specifically, the cloud orchestration platform 106 informs the node scheduling driver 110 with flow and scheduling requirements to specify which workloads to be involved and instructs that they be coordinated. A coordination schedule is now implemented. The node scheduling driver 110 coordinates the schedules of workloads based on the path determined by the cloud orchestration platform 106, as described above. The node scheduling driver 110 (e.g., Kubelet) thus communicates with the cgroups to both schedule the workloads as well as to make sure that adequate resources are reserved for the latency-sensitive application flow.

The node 108 creates cgroups for each workload, as shown in FIG. 1. The node scheduling driver 110 communicates to the cgroups 114(1)-114(4), instructing them of the system resources that are required (CPU resources, memory resources, etc.), but also acts as a central scheduler for them, ensuring that the system resources are available at the instant the flow payload arrives at the workload. This is an expansion of what cgroups normally do currently.

As described above, the policy controller 104 may be deployed as either a container itself, or independently. In either case, the policy controller 104 has an API interface into the cloud orchestration platform 106. The cloud orchestration platform 106 learns (or predicts) the services involved in the full application execution and make a decision about the resource commitments that are required. The control plane of the cloud orchestration platform 106 implements a time-sensitive-network (TSN) aware workload scheduling system, that considers the existing aggregate latency requirements of the node(s) where workloads will be placed, and provides the ability to specify TSN characteristics in the form of a manifest policy that can be used by the cloud platform resources. The cloud orchestration platform 106 also implements a data plane that is able to measure and schedule the latency for workloads being forwarded by a given node, and report the aggregate capacity and capabilities to the control plane to ensure that the real-time state of the system is measured. For example, in the case of a Kubernetes implementation, a manifest file that is pushed by the masters to the nodes has new resource constraints as part of the TSN application. The policy controller 104 communicates with the cloud orchestration platform 106 (e.g., a Kubernetes master) to inform it of the reservation requirements so they can be executed. The cloud orchestration platform 106 implements a TSN scheduler, and the node scheduling driver (Kubelet) 110 on the nodes are fed current TSN resource availability to the cloud orchestration platform 106.

Figure 2A:
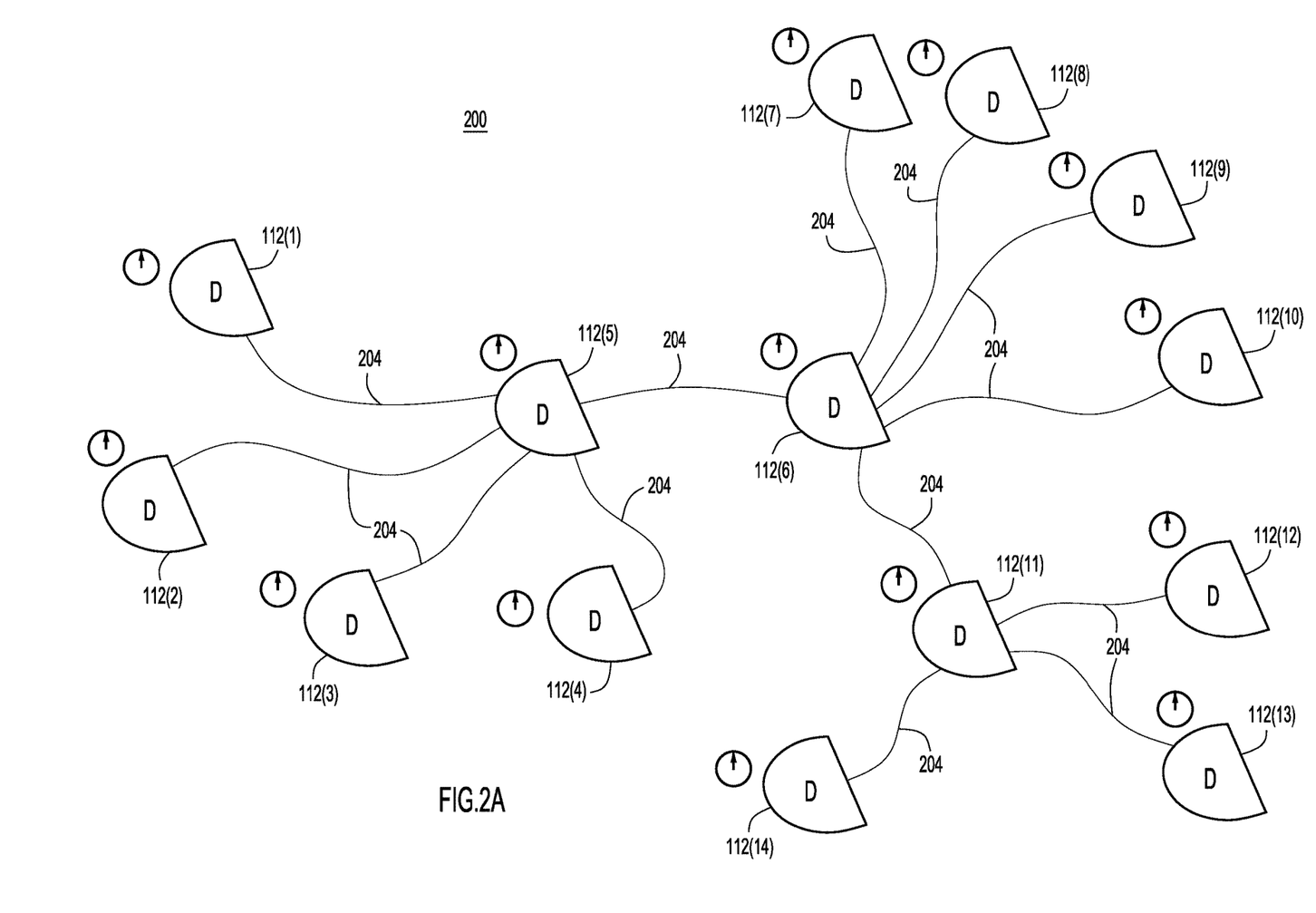
FIGS. 2A and 2B are maps showing a plurality of microservices and their interconnections, according to an example embodiment.

Turning to FIGS. 2A and 2B, and with continuing reference to FIG. 1, shown are maps 200, 250 of a plurality of microservices and their interconnections, according to an example embodiment. Referring specifically to FIG. 2A, before the cloud orchestration platform 106 configures the node scheduling driver 110 to schedule each microservice, the cloud orchestration platform 106 may determine a path that the traffic is likely to take through the node 108. To determine the likely path, the cloud orchestration platform 106 may first construct data representing the map 200. The map 200 includes a plurality of microservices 112(1)-112(14) as well as the connections 204 between the plurality of microservices 112(1)-112(14). Moreover, the map 200 may include a timeslot estimate for each microservice traffic traversal. The map 200 may be constructed using any of a number of techniques now known or hereinafter developed.

Figure 2B:
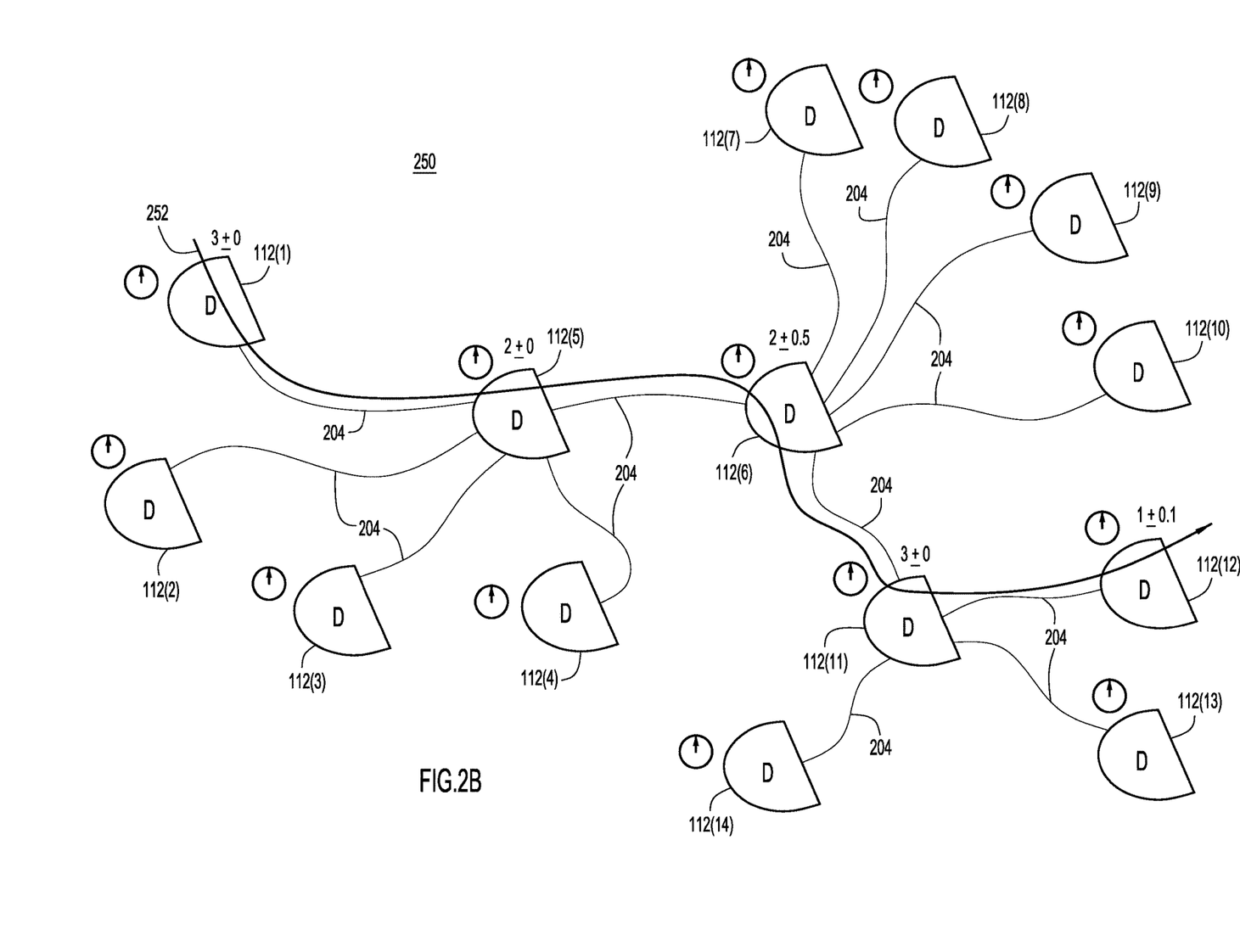

Referring to FIG. 2B, shown is the map 250 of the plurality of microservices 112(1)-112(14) and their interconnections and including a predicted path 252 for the traffic through the plurality of microservices, according to an example embodiment. To determine the predicted path 252, the cloud management platform 116 may use, for example, a synthetic probe, as mentioned above. The synthetic probe may include, for example, test packets. As a result of the synthetic probe, the predicted path 252 traverses microservices 1122(1), 112(5), 112(6), 112(11), and 112(12). After determining the predicted path 252, the cloud orchestration platform 106 communicates the predicted path 252 to the microservice policy controller 104, which generates the aforementioned manifest file. The policy controller 104 may generate the manifest file based on the predicted path 252 and the network performance requirements of the application. Based on the manifest file, the cloud orchestration platform 106 may compute a number of timeslots to reserve at each microservice included in the predicted path 252. For example, the cloud orchestration platform 106 may compute three timeslots for microservice 112(1), two timeslots for microservice 112(5), two timeslots for microservice 112(6), three timeslots for microservice 112(11), and one timeslot for microservice 112(12), as depicted in the map 250.

In addition, the cloud orchestration platform 106 may compute an amount of hardware resources required at each microservice 112(1), 112(5), 112(6), 112(11), 112(12) included in the predicted path 252 during the reserved timeslots. For example, the hardware resources may include an amount CPU resources 116, an amount of memory resources 118, and/or bandwidth resources. Based on the computed number of timeslots and/or the computed amount of hardware resources, the cloud orchestration platform 106 may reserve the timeslots and/or hardware resources at each microservice 112(1), 112(5), 112(6), 112(11), 112(12) in the predicted path 252. For example, the cloud orchestration platform 106 may direct the node scheduling driver 110 to reserve the timeslots and/or hardware resources at each of the microservices 112(1), 112(5), 112(6), 112(11), 112(12) in the predicted path 252. Therefore, in contrast to conventional time sensitive networking, the microservice time sensitive networking logic 106 causes the cloud orchestration platform 106 to reserve more than timeslots for packet transmission. The cloud orchestration platform 106 may also reserve processing cycle, memory, and bandwidth resources/timeslots.

Moreover, as described above and shown in FIG. 1, the node scheduling driver 110 may generate a control group (cgroup) for each microservice 112(1), 112(5), 112(6), 112(11), 112(12) in the predicted path 252. The node scheduling driver 110 may communicate to each cgroup 114(1)-114(4) the hardware resources that are required. The node scheduling driver 110 may also be a central scheduler for the cgroups 114(1)-114(4). Therefore, the cgroups 114(1)-114(4) may have the hardware resources (CPU resources 116 and memory resources 118) available when the network traffic reaches the microservice.

In order to ensure that the network traffic is forwarded through the microservices while satisfying the performance requirements, a software forwarding mechanism, at either the node 108 or at the plurality of microservices, may compute a resource budget. The resource budget may be based on, for example, available processing resources and memory resources. The resource budget may be provided to the microservice time sensitive networking logic 106 to determine whether the network performance requirements for the traffic may be satisfied. Based on the resource budget, the cloud orchestration platform 106 may determine whether the node 108 has additional capacity to forward the network traffic according to the network performance requirements. If not, the cloud orchestration platform 106 may determine that there is either a failure scenario or an overload scenario at the node 108. In these circumstances, the cloud orchestration platform 106 may schedule the network traffic to be forwarded by a different node.

In another embodiment, the application may require that processing services for its network traffic not be shared with other network traffic. In other words, the application may require dedicated processing services, and this requirement would be configured at the policy controller 104. Under these circumstances, in response to the application flow requirements the policy controller 104 provides to the cloud orchestration platform 106, the cloud orchestration platform 106 may instantiate new microservices specifically to satisfy the application flow requirement for dedicated processing services.

In another embodiment, IoT applications may be deployed as distributed microservices. In these circumstances, some of the operations may be physical operations, such as an IoT read, and some of the operations may be virtual operations, such as issuing a Message Queuing Telemetry Transport (MQTT) message. The cloud orchestration platform 106 may be used to export a stack, or a portion of a stack, to the microservices as necessary to meet the application requirements.

Since the cloud orchestration platform 106 predicts the hardware resources to process the network traffic at a microservice, the amount of the hardware resources is reserved at specific timeslots, as described above. Because the amount of hardware resources used by a microservice is generally highly predictable, the cloud orchestration platform 106 may reserve the number of timeslots required to process the traffic at a precise starting timeslot in the future when the traffic exits a first microservice and enters a second, subsequent microservice to process the traffic.

However, one or more microservices may have some variability in the number of timeslots used to process the traffic. To ensure the traffic is processed according to the performance requirements, guard bands, or additional timeslots, may be reserved at microservices following microservices exhibiting such processing variability. For example, the microservice 112(6) (shown in FIG. 2B) may be scheduled to receive first traffic at timeslot five because microservice 112(1) is scheduled three timeslots to process the network traffic and microservice 112(5) is scheduled two timeslots to process the traffic. The cloud orchestration platform 106 may have predicted that the microservice 112(6) will process the first traffic in two timeslots. However, the cloud orchestration platform 106 may also have determined, based on historical performance of the microservice 112(6), for example, that the microservice 112(6) may take up to 2.5 timeslots to process the network traffic. Accordingly, the cloud orchestration platform 106 may reserve a guard band at the subsequent microservice 112(11) at timeslot seven, which is the timeslot the microservice 112(11) is scheduled to receive the network traffic for processing. Consequently, the microservice 112(11) will not process a second network traffic at timeslot seven. Therefore, by reserving the guard band at the microservice 112(11), the cloud orchestration platform 106 ensures that the microservice 112(11) will have sufficient resources available to process the first network traffic between timeslots 7 and 7.5

An elasticity of the guard band may be based on a network traffic determinism elasticity. The network traffic determinism elasticity may be included within the application flow requirements sent by the policy controller 104 to the cloud orchestration platform 106. Continuing the example above, the microservice 112(11) may be scheduled to receive a second network traffic at timeslot five and the first network traffic at timeslot seven, as previously described. If the first network traffic is slightly deterministic, in other words, there is substantial variability associated with the first network traffic, then the cloud orchestration platform 106 may direct the microservice 112(11) to fully process the second network traffic at timeslot five, even at the risk of delaying the processing of the first network traffic at timeslot seven.

Figure 3:
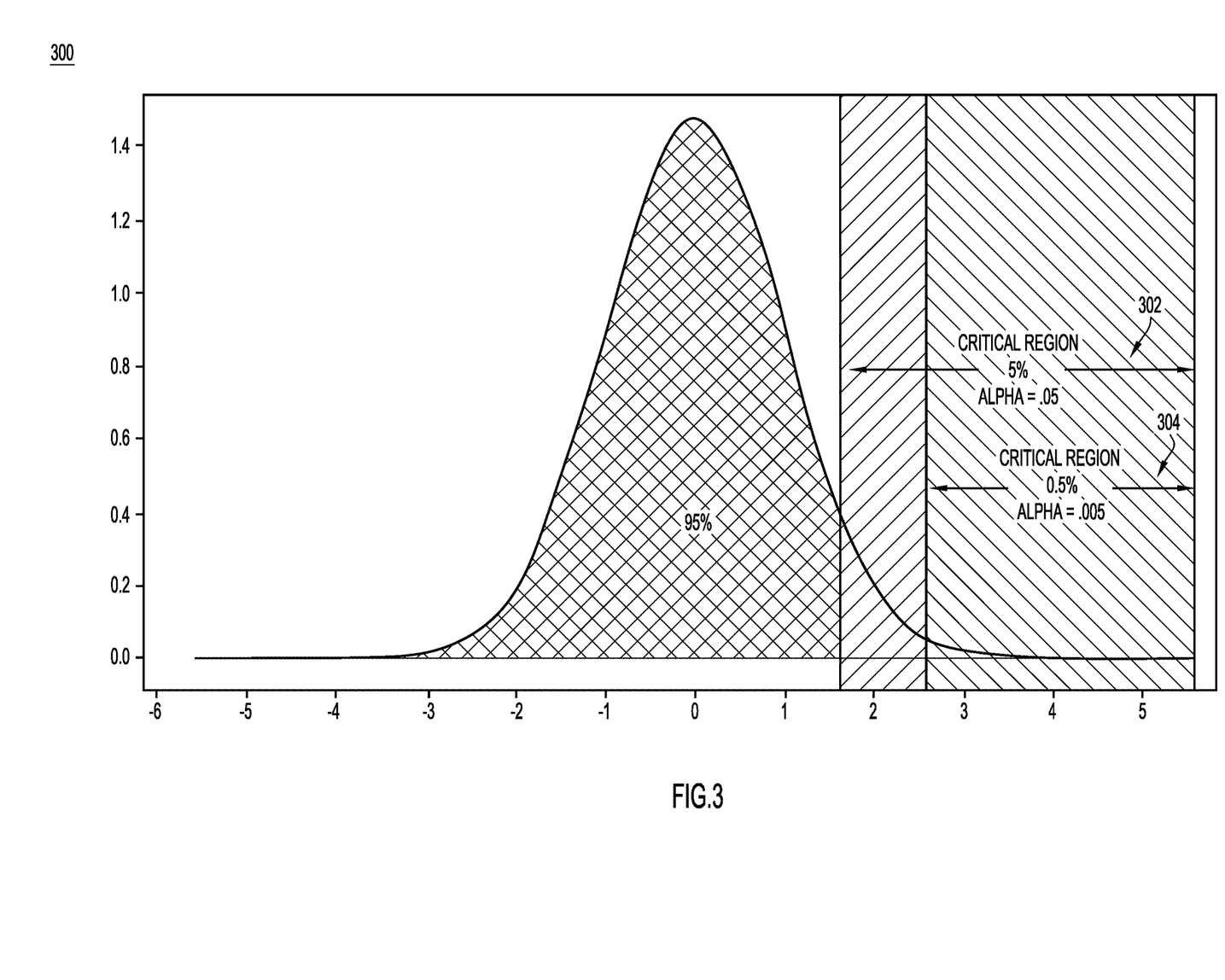
FIG. 3 illustrates a probability distribution function of a microservice processing network traffic in a number of timeslots reserved at the microservice, according to an example embodiment.

Turning now to FIG. 3, and with continuing reference to FIGS. 1, 2A and 2B, a probability distribution function 300 is shown of a microservice processing the network traffic in the number of timeslots reserved at the microservice, according to an example embodiment. The network traffic determinism elasticity may be represented as a number in a predetermined range of numbers. The network traffic determinism elasticity may be compared to a probability of a microservice processing the network traffic within the timeslots reserved at the microservice. For example, the probability may be depicted by the probability distribution function 300. The probability distribution function 300 may have a "normal" distribution. However, it should be appreciated that other distributions are possible as well. Because the probability distribution function 300 is normally distributed, a confidence level may be set. The confidence level may be set according to the network traffic determinism elasticity. The cloud orchestration platform 106 may compute a standard deviation for the probability distribution function 300 to determine whether the expected network traffic processing performance is within the confidence level. When the expected network traffic processing performance, based on the standard deviation, is within the confidence level, the cloud orchestration platform 106 reserves the timeslots without guard bands at the microservice. However, when the expected network traffic processing performance, based on the standard deviation, is outside the confidence level, the cloud orchestration platform 106 reserves the timeslots with guard bands.

For example, the probability distribution function 300 includes two confidence levels 302 and 304. Confidence level 302 depicts a confidence level of 5% while confidence level 304 depicts a confidence level of 0.5%. Network traffic that requires a higher determinism may use a higher confidence level when determining the probability of the microservice processing the network traffic within the timeslots reserved at the microservice. In contrast, network traffic that does not require a higher determinism, in other words, network traffic that has greater scheduling elasticity, may use a lower confidence level when determining the probability of the microservice processing the network traffic within the timeslots reserved at the microservice. For example, the network traffic requiring the higher determinism may use the confidence level 304, which has a confidence level of 0.5%. In contrast, the network traffic that has greater scheduling elasticity may use the confidence level 302, which has a confidence level of 5%. In other words, the network traffic requiring higher determinism may use guard bands when there is greater than a 0.5% variation while the network traffic with greater scheduling elasticity may use guard bands when there is greater than a 5% variation. Consequently, the network traffic requiring higher determinism may use guard bands more frequently to assure compliance with the network performance requirements.

Figure 4:
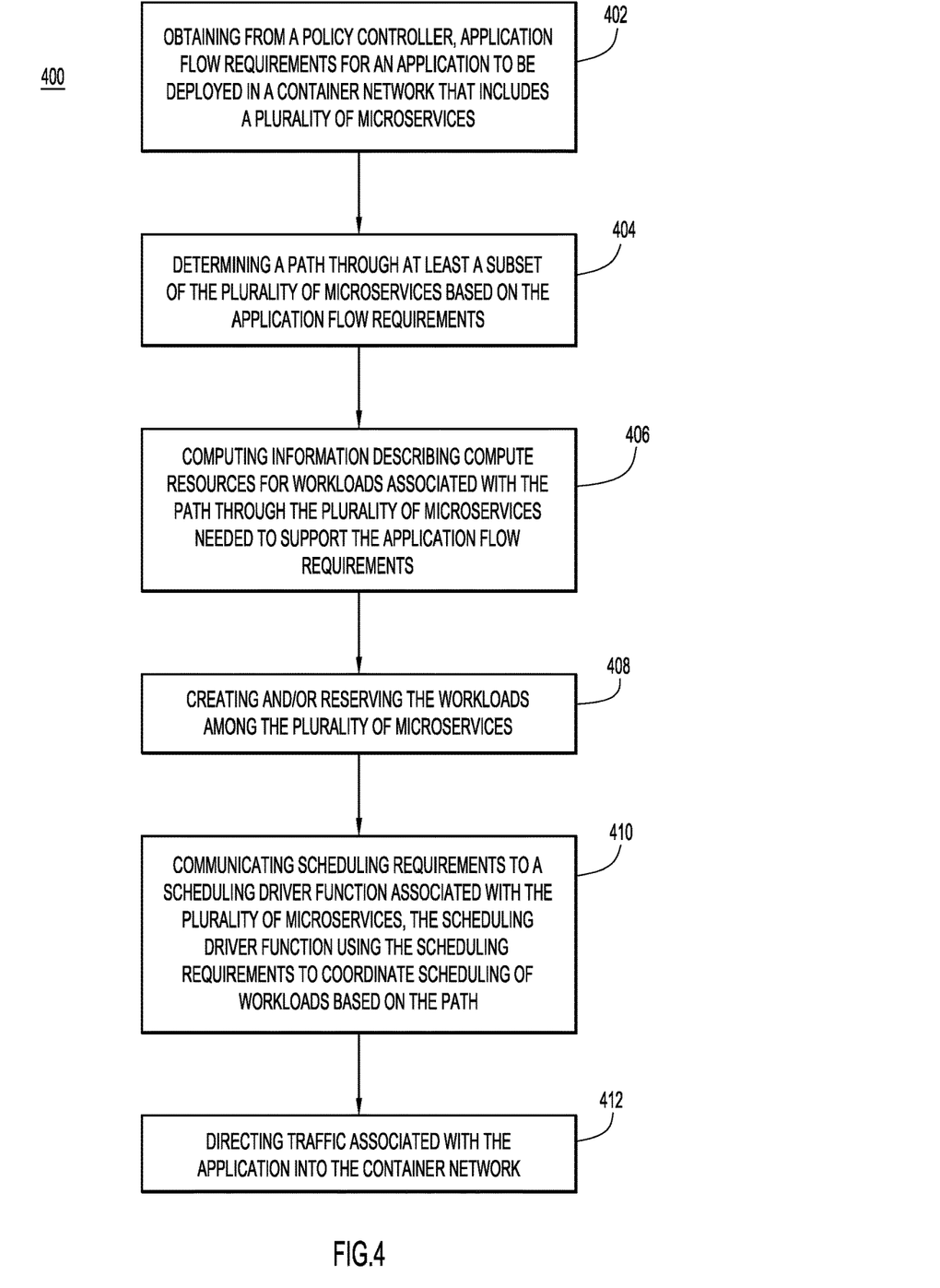
FIG. 4 is a flowchart depicting a method for time sensitive networking in a microservice environment, according to an example embodiment.

Turning to FIG. 4, with continued reference to FIG. 1, shown is a flowchart depicting operations of a method 400 for time sensitive networking in a microservice environment, according to an example embodiment. At operation 402, a cloud orchestration platform obtains from a policy controller, application flow requirements for an application to be deployed in a container network that includes a plurality of microservices. For example, the application flow requirements may include end-to-end latency or jitter requirements.

At operation 404, the cloud orchestration platform determines a path through at least a subset of the plurality of microservices based on the application flow requirements. The selected subset of microservices may be based on a synthetic probe sent into the plurality of microservices by, for example, the cloud orchestration platform.

At operation 406, the cloud orchestration platform computes information describing compute resources for workloads associated with the path through the plurality of microservices needed to support the application flow requirements.

At operation 408, the cloud orchestration platform creates and/or reserves the workloads among the plurality of microservices.

At operation 410, the cloud orchestration platform communicates scheduling requirements to a scheduling driver function associated with the plurality of microservices, the scheduling deriver function using the scheduling requirements to coordinate scheduling of workloads based on the path.

At 412, the cloud orchestration platform directs traffic associated with the application into the container network.

The method 400 may further include an operation of obtaining from the policy controller a manifest file computed by the policy controller based on the path determined by the cloud orchestration platform. In this case, the computing operation 406 information is performed using the manifest file.

The creating and/or reserving operation 408 may include computing a number of timeslots for each respective microservice in the subset for processing the traffic according to the application flow requirements, and reserving the number of timeslots for each respective microservice in the subset at each of the respective microservices. The creating and/or reserving operation may further include determining at least one of processing resources, memory resources, and bandwidth resources at each respective microservice of the subset to process the traffic according to the container network performance requirements; and reserving at least one of the processing resources, memory resources, and bandwidth resources during the timeslots reserved at each respective microservice.

Furthermore, the application flow requirements may specify that processing resources that cannot be shared with other traffic, in which case the method 400 may further include instantiating a new microservice to satisfy the application flow requirement for dedicated processing services.

In one form, as described above in connection with FIG. 3, the method 400 may further include computing a probability that a first microservice in the subset processes the traffic in the number of timeslots reserved at the first microservice; and when the probability is less than a predetermined threshold, reserving an additional timeslot at a second microservice in the subset, wherein the second microservice receives the traffic from the first microservice. The predetermined threshold may be based on a standard deviation of the probability and a confidence level of the traffic. The traffic may have an associated determinism elasticity value, wherein the confidence level is based on the determinism elasticity value.

Many applications require time-sensitive support, including factory automation systems, electrical protection systems, streaming video systems, and autonomous guided vehicles. As this technology matures many of these applications will have at least part of their network in a container environment.

As explained above, the concept of reservation is expanded to more than just packet scheduling. Many more parameters are included, such as CPU cycle slot times, memory reservation, and bandwidth. In addition, a TSN application may use a mixture of traditional TSN scheduling on networking devices (the underlay) as well as scheduling within the microservices in the overlay.

In summary, the techniques presented herein use a scheduler to first learn or predict the path through the container network, then to schedule timeslots with each microservice along the path such that the end-to-end latency can be minimized and predicted. Furthermore, a goal of the time-sensitive networking techniques presented herein is to achieve predictable latency. Unlike wireless or wired environments that use dedicated devices, simply scheduling transmit slot times is not enough to achieve predictable latency in a microservice environment. This is because it is based on a shared CPU, shared memory architecture. Considering that it is impossible to predict latency with absolute certainty in a microservice environment, a "confidence level" based on predictability using statistical modeling is employed to get as close as possible to a desired latency outcome. As drift occurs further away from the prediction, this is used as a trigger for scaling of new microservices.

Figure 5:
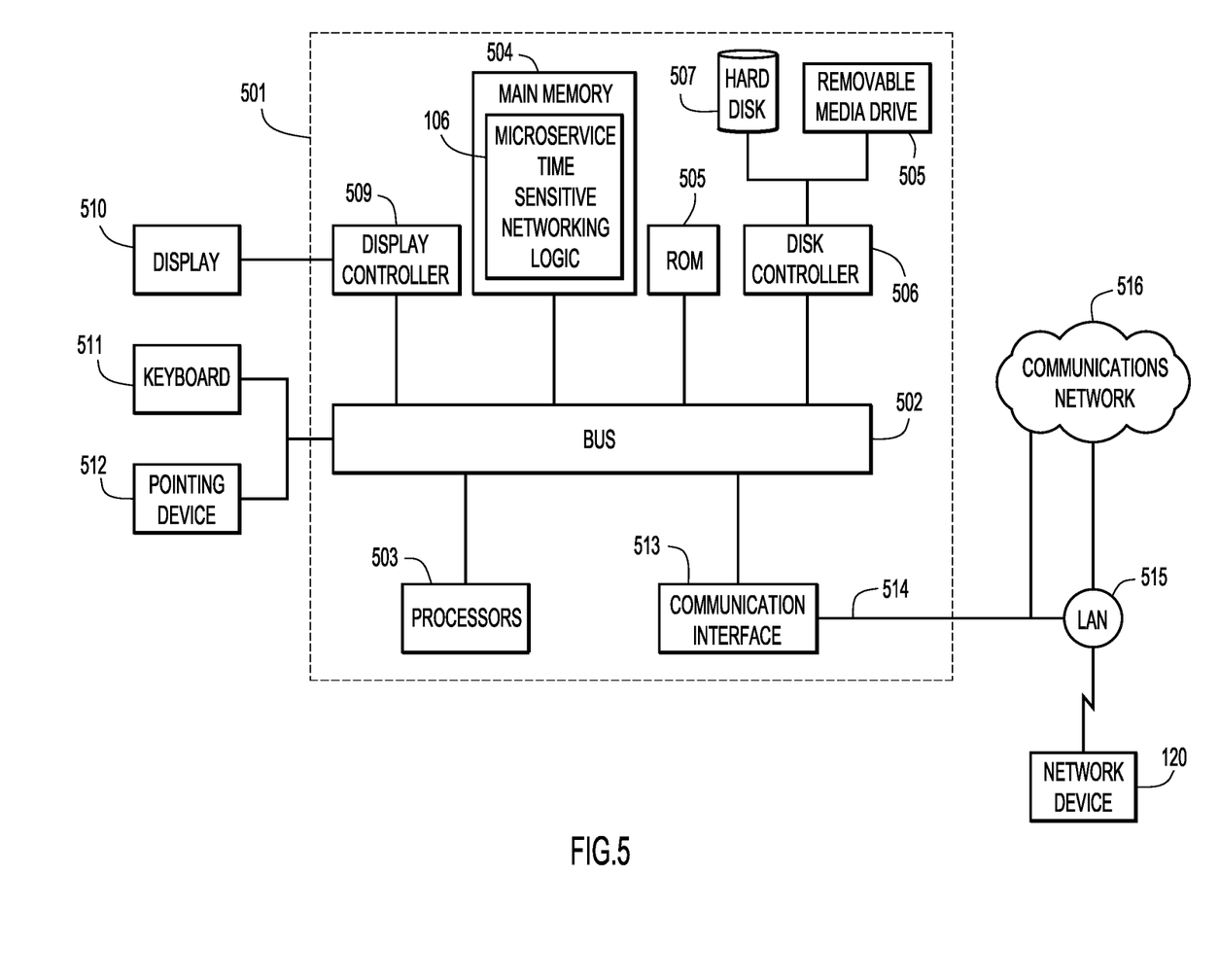
FIG. 5 is a block diagram of a server configured to perform time sensitive networking techniques in a microservice environment, according to an example embodiment.

FIG. 5 is a block diagram showing a server on which the operations of the policy controller 104 or cloud orchestration platform 116 shown in FIG. 1 may be performed. FIG. 5 illustrates a computer system 501 upon which the embodiments presented may be implemented. The computer system 501 includes a bus 502 or other communication mechanism for communicating information, and a processor 503 coupled with the bus 502 for processing the information. While the figure shows a single block 503 for a processor, it should be understood that the processors 503 represent a plurality of processing cores, each of which can perform separate processing. The computer system 501 also includes a main memory 504, such as a random access memory (RAM) or other dynamic storage device (e.g., dynamic RAM (DRAM), static RAM (SRAM), and synchronous DRAM (SD RAM)), coupled to the bus 502 for storing information and instructions to be executed by processor 503. In addition, the main memory 504 may be used for storing temporary variables or other intermediate information during the execution of instructions by the processor 503.

The computer system 501 further includes a read only memory (ROM) 505 or other static storage device (e.g., programmable ROM (PROM), erasable PROM (EPROM), and electrically erasable PROM (EEPROM)) coupled to the bus 502 for storing static information and instructions for the processor 503.

The computer system 501 also includes a disk controller 506 coupled to the bus 502 to control one or more storage devices for storing information and instructions, such as a magnetic hard disk 507, and a removable media drive 508 (e.g., read-only compact disc drive and read/write compact disc drive). The storage devices may be added to the computer system 501 using an appropriate device interface (e.g., small computer system interface (SCSI), integrated device electronics (IDE), enhanced-IDE (E-IDE), direct memory access (DMA), or ultra-DMA).

The computer system 501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 501 may also include a display controller 509 coupled to the bus 502 to control a display 510, such as a flat panel display, for displaying information to a computer user. The computer system 501 includes input devices, such as a keyboard 511 and a pointing device 512, for interacting with a computer user and providing information to the processor 503. The pointing device 512, for example, may be a mouse, a trackball, or a pointing stick for communicating direction information and command selections to the processor 503 and for controlling cursor movement on the display 510.

The computer system 501 performs a portion or all of the processing steps of the process in response to the processor 503 executing one or more sequences of one or more instructions contained in a memory, such as the main memory 504. Such instructions may be read into the main memory 504 from another computer readable medium, such as a hard disk 507 or a removable media drive 508. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

As stated above, the computer system 501 includes at least one computer readable medium or memory for holding instructions programmed according to the embodiments presented, for containing data structures, tables, records, or other data described herein. Examples of computer readable media are compact discs, hard disks, PROMs (EPROM, EEPROM, flash EPROM), DRAM, SRAM, SD RAM, or any other magnetic medium, compact discs (e.g., CD-ROM), or any other medium from which a computer can read.

Stored on any one or on a combination of non-transitory computer readable storage media, embodiments presented herein include software for controlling the computer system 501, for driving a device or devices for implementing the process, and for enabling the computer system 501 to interact with a human user. Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 501 also includes a communication interface 513 coupled to the bus 502. The communication interface 513 provides a two-way data communication coupling to a network link 514 that is connected to, for example, a local area network (LAN) 515, or to another communications network 516 such as the Internet. For example, the communication interface 513 may be a wired or wireless network interface card to attach to any packet switched (wired or wireless) LAN. As another example, the communication interface 513 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 513 sends and receives electrical, electromagnetic or optical signals that carry digital data streams representing various types of information.

The network link 514 typically provides data communication through one or more networks to other data devices. For example, the network link 514 may provide a connection to another computer through a local area network 515 (e.g., a LAN) or through equipment operated by a service provider, which provides communication services through a communications network 516. The local network 514 and the communications network 516 use, for example, electrical, electromagnetic, or optical signals that carry digital data streams, and the associated physical layer (e.g., CAT 5 cable, coaxial cable, optical fiber, etc.). The computer system 501 can transmit and receive data, including program code, through the network(s) 515 and 516, the network link 514 and the communication interface 513. Moreover, the network link 514 may provide a connection through a LAN 515 to network device 120.

The programs described herein may be identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, read only memory (ROM), floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language, Python language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, a method is provided. The method includes, at a cloud orchestration platform, obtaining from a policy controller, application flow requirements for an application to be deployed in a container network that includes a plurality of microservices; determining a path through at least a subset of the plurality of microservices based on the application flow requirements; computing information describing compute resources for workloads associated with the path through the plurality of microservices needed to support the application flow requirements; creating and/or reserving the workloads among the plurality of microservices; communicating scheduling requirements to a scheduling driver function associated with the plurality of microservices, the scheduling deriver function using the scheduling requirements to coordinate scheduling of workloads based on the path; and directing traffic associated with the application into the container network.

In another embodiment, an apparatus is provided comprising: a communication interface configured to enable network communications; and a processor coupled with the communication interface, and configured to perform operations including: obtaining from a policy controller, application flow requirements for an application to be deployed in a container network that includes a plurality of microservices; determining a path through at least a subset of the plurality of microservices based on the application flow requirements; computing information describing compute resources for workloads associated with the path through the plurality of microservices needed to support the application flow requirements; creating and/or reserving the workloads among the plurality of microservices; communicating scheduling requirements to a scheduling driver function associated with the plurality of microservices, the scheduling deriver function using the scheduling requirements to coordinate scheduling of workloads based on the path; and directing traffic associated with the application into the container network.

In yet another embodiment, one or more non-transitory computer readable storage media are provided, encoded with instructions, that when executed by a processor in a cloud orchestration platform associated with a container network, cause the processor to perform operations including: obtaining from a policy controller, application flow requirements for an application to be deployed in the container network that includes a plurality of microservices; determining a path through at least a subset of the plurality of microservices based on the application flow requirements; computing information describing compute resources for workloads associated with the path through the plurality of microservices needed to support the application flow requirements; creating and/or reserving the workloads among the plurality of microservices; communicating scheduling requirements to a scheduling driver function associated with the plurality of microservices, the scheduling deriver function using the scheduling requirements to coordinate scheduling of workloads based on the path; and directing traffic associated with the application into the container network.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   at a cloud orchestration platform, obtaining from a policy controller, application flow requirements for an application to be deployed in a container network that includes microservices;
   determining a path through a subset of the microservices based on the application flow requirements;
   computing information describing compute resources for workloads associated with the path through the subset needed to support the application flow requirements;
   creating and/or reserving the workloads among the subset;
   communicating scheduling requirements to a scheduling driver function associated with the subset, the scheduling deriver function using the scheduling requirements to coordinate scheduling of the workloads based on the path;
   directing traffic associated with the application into the container network; and
   computing a probability that a first microservice in the subset processes the traffic in a number of timeslots reserved at the first microservice; and
   based on the probability, reserving an additional timeslot at a second microservice in the subset that receives the traffic from the first microservice.

2. The method of claim 1, further comprising obtaining from the policy controller a manifest file computed by the policy controller based on the path determined by the cloud orchestration platform, wherein the computing information describing compute resources for the workloads is performed using the manifest file.

3. The method of claim 1, wherein the creating and/or reserving includes:
   computing a number of timeslots for each respective microservice in the subset for processing the traffic according to the application flow requirements; and
   reserving the number of timeslots for each said respective microservice.

4. The method of claim 3, wherein the creating and/or reserving includes:
   determining at least one of: processing resources; memory resources; and bandwidth resources at each said respective microservice to process the traffic according to performance requirements of the container network; and
   reserving the at least one of the: the processing resources; the memory resources; and the bandwidth resources during the timeslots reserved at each said respective microservice.

5. The method of claim 1, wherein the application flow requirements specify that processing resources that cannot be shared with other traffic, the method further comprising:
   instantiating a new microservice to satisfy the application flow requirements for dedicated processing services.

6. The method of claim 1, wherein:
   when the probability is less than a predetermined threshold, reserving the additional timeslot at the second microservice.

7. The method of claim 6, wherein the predetermined threshold is based on a standard deviation of the probability and a confidence level of the traffic.

8. The method of claim 7, wherein the traffic have an associated determinism elasticity value, wherein the confidence level is based on the associated determinism elasticity value.

9. An apparatus comprising:
   a communication interface configured to enable network communications; and
   a processor coupled with the communication interface, and configured to perform operations including:
     obtaining from a policy controller, application flow requirements for an application to be deployed in a container network that includes microservices;
     determining a path through a subset of the microservices based on the application flow requirements;
     computing information describing compute resources for workloads associated with the path through the subset needed to support the application flow requirements;
     creating and/or reserving the workloads among the subset;
     communicating scheduling requirements to a scheduling driver function associated with subset, the scheduling deriver function using the scheduling requirements to coordinate scheduling of workloads based on the path;
     directing traffic associated with the application into the container network;
     computing a probability that a first microservice in the subset processes the traffic in a number of timeslots reserved at the first microservice; and
     based on the probability, reserving an additional timeslot at a second microservice in the subset that receives the traffic from the first microservice.

10. The apparatus of claim 9, wherein the processor is further configured to obtain from the policy controller a manifest file computed based on the path, and compute the information describing compute resources for the workloads using the manifest file.

11. The apparatus of claim 9, wherein the processor is configured to perform the creating and/or reserving by:
  computing a number of timeslots for each respective microservice in the subset for processing the traffic according to the application flow requirements; and
  reserving the number of timeslots for each said respective microservice.

12. The apparatus of claim 11, wherein the processor is configured to perform the creating and/or reserving by:
  determining at least one of: processing resources; memory resources; and bandwidth resources at each said respective microservice to process the traffic according to performance requirements of the container network; and
  reserving the at least one of the: the processing resources; the memory resources; and the bandwidth resources during the timeslots reserved at each said respective microservice.

13. The apparatus of claim 9, wherein the application flow requirements specify that processing resources that cannot be shared with other traffic, wherein the processor is further configured to:
  instantiate a new microservice to satisfy the application flow requirement for dedicated processing services.

14. The apparatus of claim 9, wherein the processor is further configured to perform operations including:
  when the probability is less than a predetermined threshold, reserving the additional timeslot at the second microservice.

15. The apparatus of claim 14, wherein the predetermined threshold is based on a standard deviation of the probability and a confidence level of the traffic.

16. The apparatus of claim 15, wherein the traffic includes a determinism elasticity value, wherein the confidence level is based on the determinism elasticity value.

17. One or more non-transitory computer readable storage media encoded with instructions that, when executed by a processor in a cloud orchestration platform associated with a container network, cause the processor to perform operations including:
  obtaining from a policy controller, application flow requirements for an application to be deployed in the container network that includes microservices;
  determining a path through a subset of the microservices based on the application flow requirements;
  computing information describing compute resources for workloads associated with the path through the subset needed to support the application flow requirements;
  creating and/or reserving the workloads among the subset;
  communicating scheduling requirements to a scheduling driver function associated with the subset, the scheduling deriver function using the scheduling requirements to coordinate scheduling of workloads based on the path;
  directing traffic associated with the application into the container network; and
  computing a probability that a first microservice in the subset processes the traffic in a number of timeslots reserved at the first microservice; and
  based on the probability, reserving an additional timeslot at a second microservice in the subset that receives the traffic from the first microservice.

18. The one or more non-transitory computer readable storage media of claim 17, wherein the instructions for creating and/or reserving include instructions for:
  computing a number of timeslots for each respective microservice in the subset for processing the traffic according to the application flow requirements; and
  reserving the number of timeslots for each said respective microservice.

19. The one or more non-transitory computer readable storage media of claim 17, wherein the instructions for creating and/or reserving include instructions for:
  determining at least one of: processing resources; memory resources; and bandwidth resources at each said respective microservice to process the traffic according to performance requirements of the container network; and
  reserving the at least one of the: the processing resources; the memory resources; and the bandwidth resources during the timeslots reserved at each said respective microservice.

20. The one or more non-transitory computer readable storage media of claim 17, further comprising instructions that cause the processor to perform operations including:
  when the probability is less than a predetermined threshold, reserving the additional timeslot at the second microservice.

* * * * *